Nov. 9, 1937.   M. J. PETERSEN   2,098,552
AGRICULTURAL IMPLEMENT
Filed Feb. 23, 1937   5 Sheets-Sheet 1
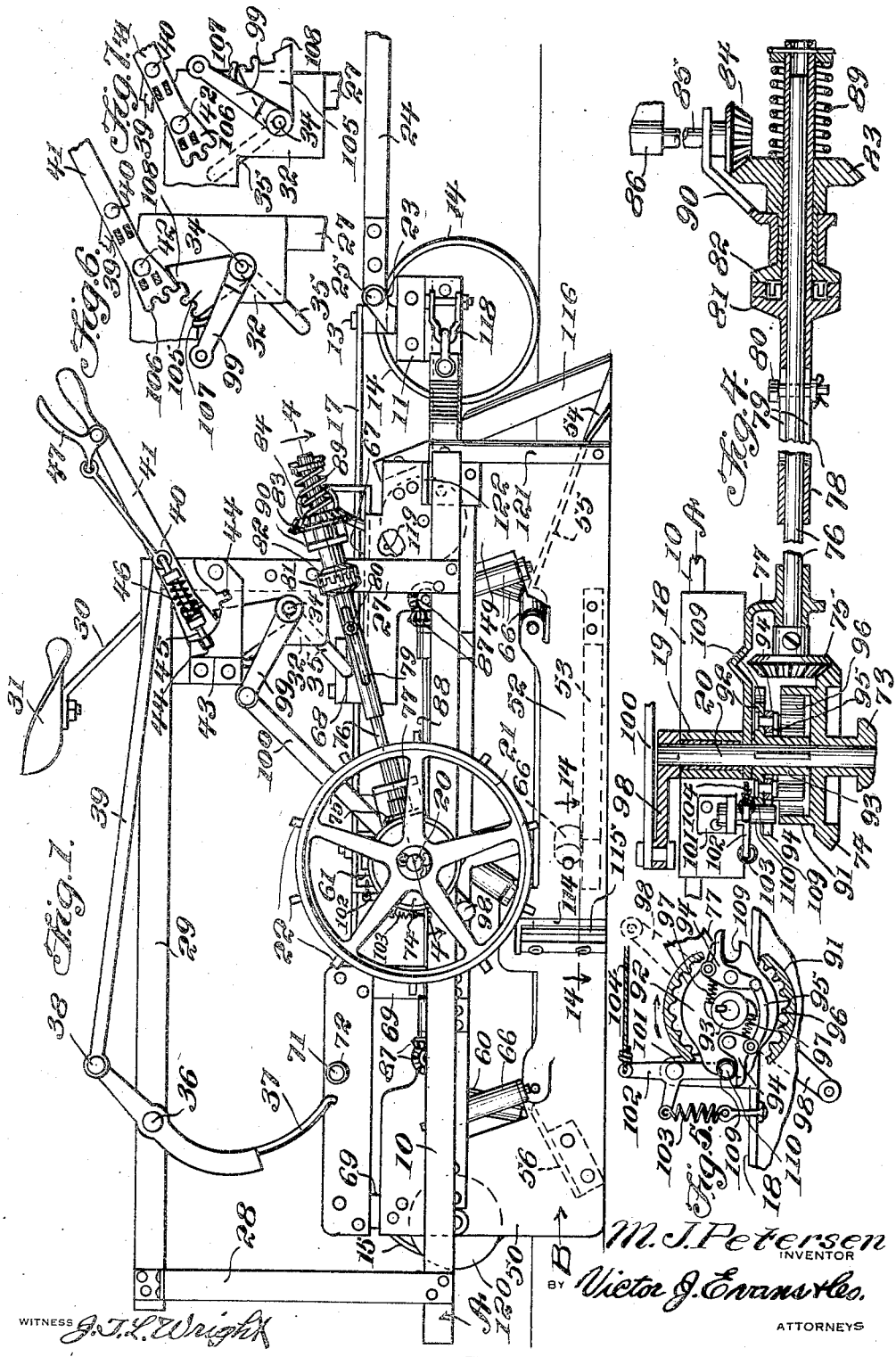
M. J. Petersen
INVENTOR
BY Victor J. Evans & Co.
ATTORNEYS
WITNESS J. T. L. Wright

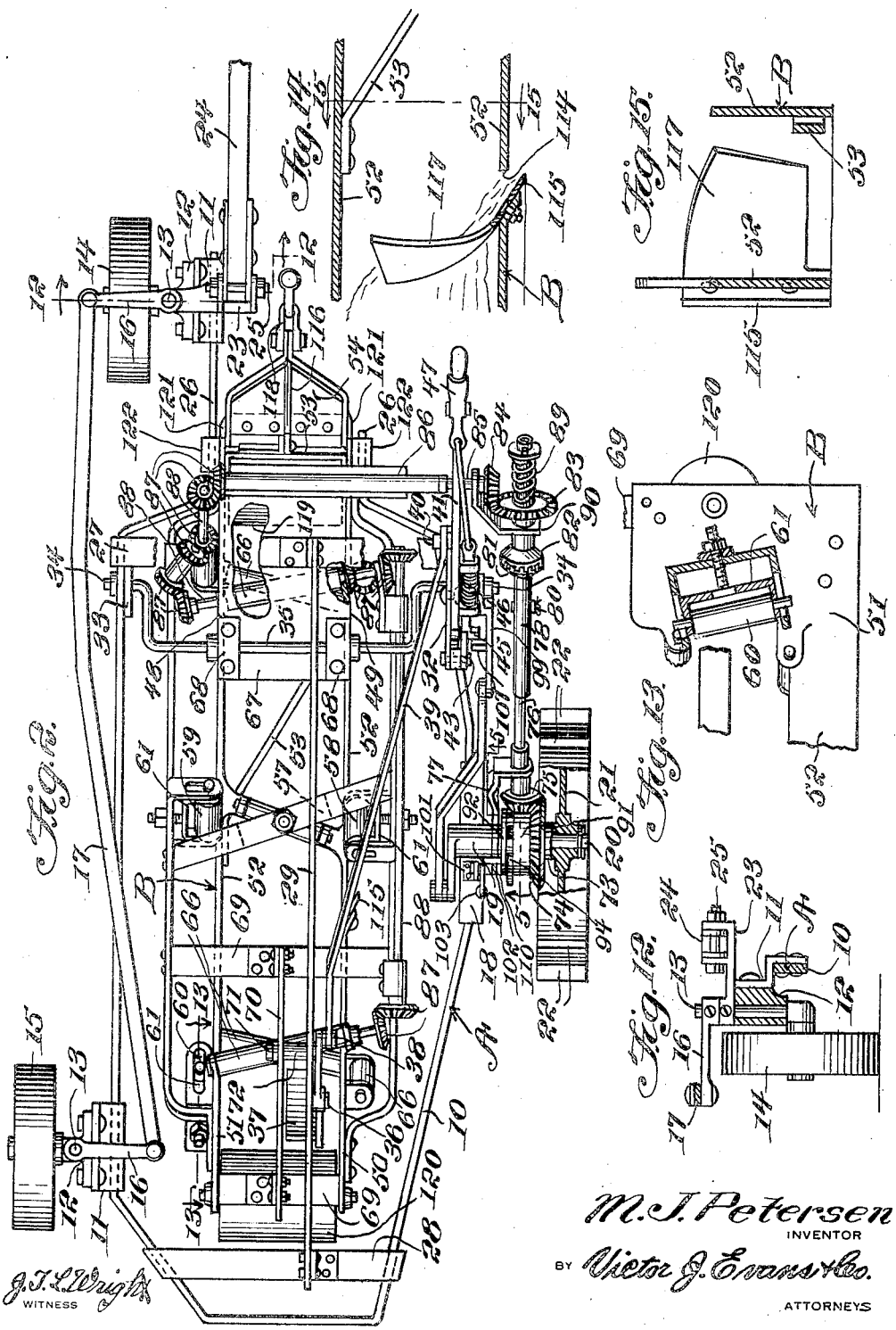

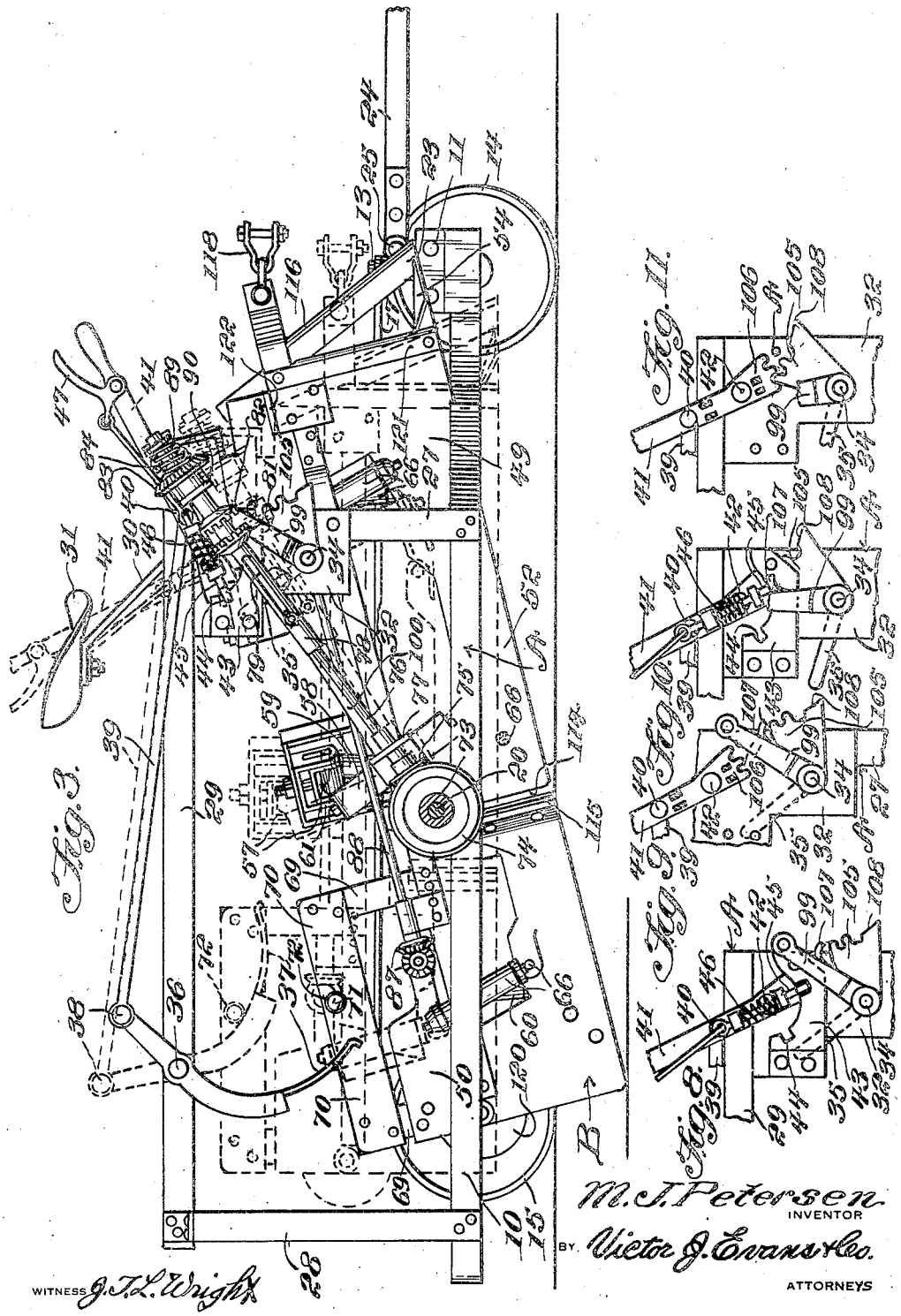

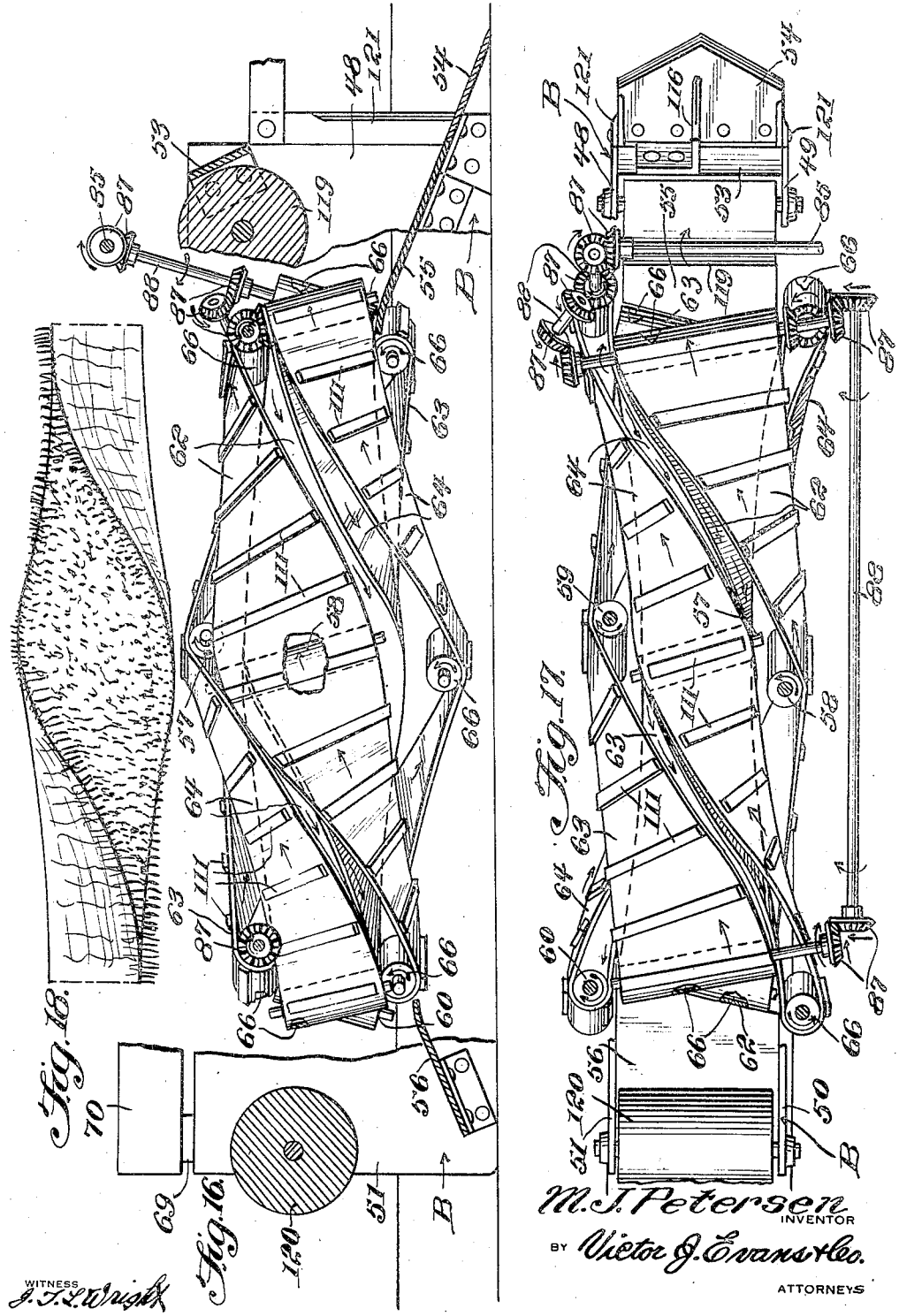

Nov. 9, 1937.  M. J. PETERSEN  2,098,552
AGRICULTURAL IMPLEMENT
Filed Feb. 23, 1937  5 Sheets-Sheet 5
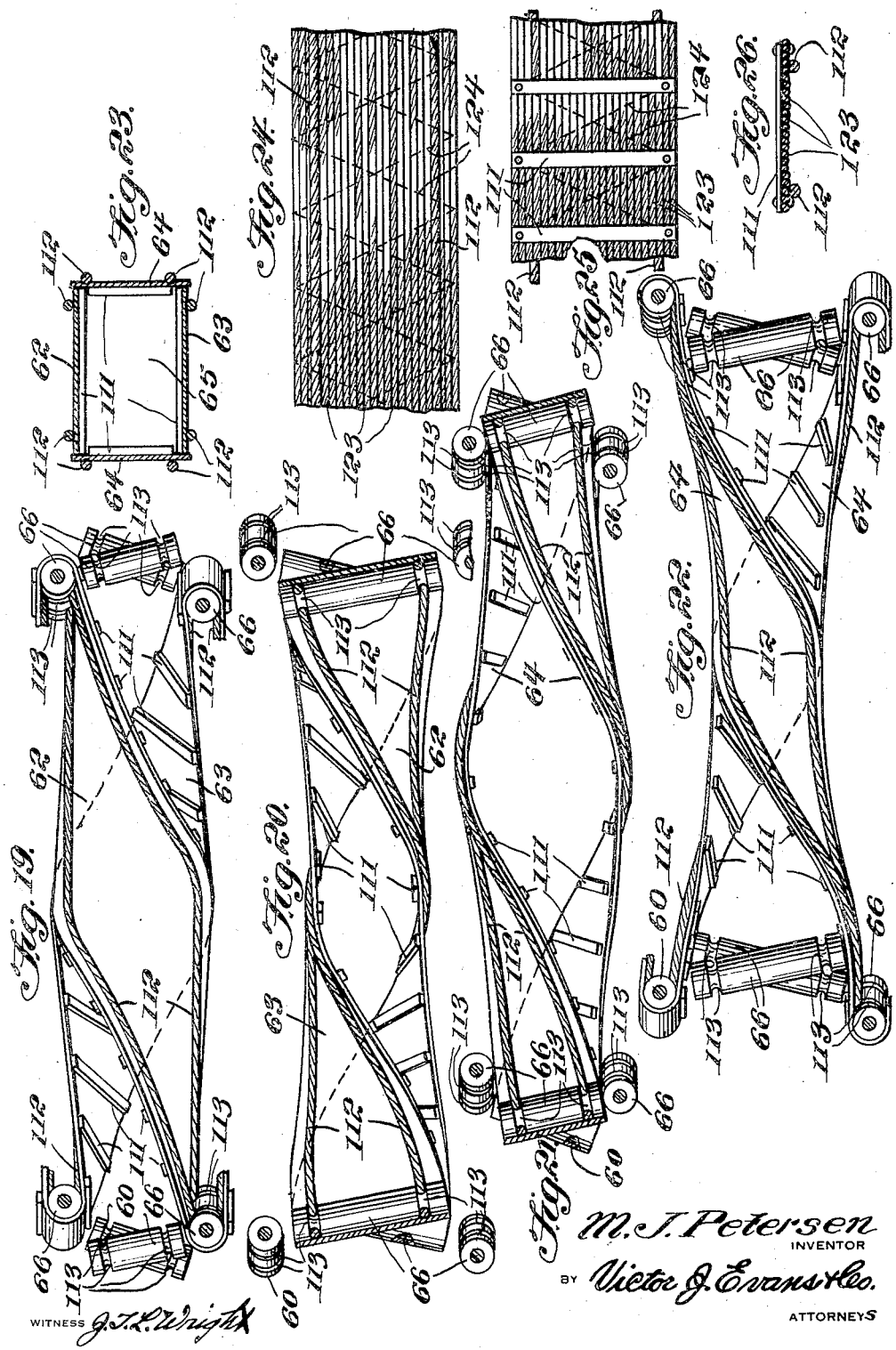

Patented Nov. 9, 1937

2,098,552

UNITED STATES PATENT OFFICE 2,098,552

AGRICULTURAL IMPLEMENT

Martin J. Petersen, Canyon, Minn.

Application February 23, 1937, Serial No. 127,305

14 Claims. (Cl. 97—10)

The invention relates to an agricultural implement and more especially to a weed or quack grass plow or exterminator.

The primary object of the invention is the provision of a plow or exterminator of this character, wherein there is involved refinements over the subject matter of United States Letters Patent No. 1,919,705 issued on the twenty-fifth day of July, 1933, the mechanism for the cutting and taking up of a slice of the ground or sod is susceptible of having its forward end raised through a power lift while the rear end thereof is manually lifted to remove the said mechanism from working position in the ground and also the said mechanism will be lowered to a working position in a novel manner.

Another object of the invention is the provision of a plow or exterminator of this character, wherein the mechanism for the cutting or slicing of the ground or sod is supported by a carriage so that said mechanism can be raised and lowered independently of the carriage and also that the said mechanism can be presented in a proper working position for the cutting or slicing of the soil.

A further object of the invention is the provision of a plow or exterminator of this character, wherein a cutting blade will cut a slice of earth and a plurality of conveyors or belts will receive the slice, these conveyors or belts being so mounted that as the slice is carried rearwardly, it will be completely overturned and delivered to the ground in this overturned position so that the roots of plants and weeds will be uppermost while the said plants or weeds will be disposed upside down on the redeposit of the slice.

A further object of the invention is the provision of a plow or exterminator of this character, wherein the carriage is of novel construction and supports a traction wheel for the transmitting of power to the mechanism for the handling of a slice of earth after the same has been cut or taken from the soil whereby such slice of earth can be inverted on redeposit on the ground and within the furrow from which the same was originally taken, the carriage being also equipped with steering wheels for enabling the plow or the exterminator to be properly guided and turned when the occasion requires.

A still further object of the invention is the provision of a plow or exterminator of this character, wherein the power transmitted by the traction wheel will be automatically cut off from the mechanism for handling a slice of earth or a block of sod cut from the ground and this cutting off of the power thereto occurs when such mechanism is lifted or raised from working position with respect to the ground.

A still further object of the invention is the provision of a plow or exterminator of this character, wherein a side cutter is disposed to widen a ditch or furrow resultant by slicing from the ground earth or sod so that sufficient clearance will be had in the ditch or furrow for the redeposit of the slice when the same has been inverted on its redeposit, the inverting of the slice causes the killing or destroying of grass and weeds, particularly quack grass.

A still further object of the invention is the provision of a plow or exterminator of this character, wherein numerous refinements exist over the subject matter of the aforesaid Letters Patent of the United States.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation of the plow or exterminator constructed in accordance with the invention and partly broken away with the belts or conveyors removed in a working position to the ground.

Figure 2 is a top plan view partly broken away thereof.

Figure 3 is a view similar to Figure 1 showing the plow and conveyor or belt mechanism lifted at its forward end by full lines and by dotted lines the complete lifted position thereof.

Figure 4 is an enlarged fragmentary sectional view taken on the line 4—4 of Figure 1 looking in the direction of the arrows.

Figure 5 is a vertical sectional view through the power lift clutch taken on the line 5—5 of Figure 2.

Figure 6 is a fragmentary elevation of the rack segment controlled by the power lift clutch in a position when the plow or exterminator is in working relation to the ground.

Figure 7 is a view similar to Figure 6 showing the rack segment in shifted position when the plow or exterminator slicing and conveyor mechanism has been raised at the front end thereof.

Figure 8 is a view similar to Figure 7 showing the position of the rack segment as in said Figure 7 and the hand throw lever shifted to the dotted line position shown in Figure 3 and such lever latched with the keeper therefor.

Figure 9 is a view similar to Figure 8 with the keeper removed.

Figure 10 is a view similar to Figure 8 showing the automatic relation of the hand throw lever and the shifting of the rack segment for the initial lowering of the rear end of the plow and conveyor mechanism.

Figure 11 is a view similar to Figure 10 with the keeper for the throw lever removed.

Figure 12 is a sectional view on the line 12—12 of Figure 2 looking in the direction of the arrows.

Figure 13 is a sectional view on the line 13—13 of Figure 2 looking in the direction of the arrows.

Figure 14 is a sectional view on the line 14—14 of Figure 1 looking in the direction of the arrows.

Figure 15 is a sectional view on the line 15—15 of Figure 14 looking in the direction of the arrows.

Figure 16 is a fragmentary vertical longitudinal sectional view showing the arrangement of the conveyors or belts and the disposition of the top and side ones thereof.

Figure 17 is a horizontal sectional view showing in top plan the said conveyors or belts.

Figure 18 is a plan view of the turnover course of the slice of sod by the action of the conveyors or belts.

Figure 19 is a fragmentary vertical sectional view showing the lay of the top and bottom conveyors or belts in the arrangement of the same and the path of travel of the stretches thereof.

Figure 20 is a top plan view partly in section of the parts shown in Figure 19.

Figure 21 is a vertical longitudinal sectional view showing partly in section the arrangement and the lay of the side conveyors or belts.

Figure 22 is a top plan view partly in section of the parts shown in Figure 21.

Figure 23 is a vertical transverse sectional view through the conveyors or belts.

Figure 24 is a fragmentary plan view of a slight modification of one of the belts or conveyors looking toward one face thereof.

Figure 25 is a view similar to Figure 24 looking toward the opposite face.

Figure 26 is a vertical transverse sectional view of the same.

Similar reference characters indicate corresponding parts throughout the several views in the drawings.

Referring to the drawings in detail, the plow or exterminator which involves refinements over the subject matter of Letters Patent of the United States No. 1,919,705 issued on the twenty-ty-fifth day of July, 1933, comprises a carriage A involving a main frame 10 which at one side sill thereof has fixed thereto brackets 11 carrying bearings 12 in which are fitted the vertical stems 13 of wheel axles for front and rear steering wheels 14 and 15, respectively. These stems 13 of the said axles have fixed thereto reversely directed arms 16 connected by a tie rod 17 pivoted thereto so that when the front steering wheel 14 is turned the rear steering wheel 15 will be swung reversely thereto and in this manner the plow or exterminator can be guided and turned in the path of travel thereof.

On the other or opposite side sill of the main frame 10 medially with respect to the wheels 14 and 15 is a bracket 18 carrying a bearing 19 in which is rotatably held a shaft or axle 20 having journaled thereon a traction power wheel 21 carrying at its tread antiskid cleats 22 as usual and is free for rotation on said shaft or axle 20. Fitted to the stem 13 of the axle for the front steering wheel 14 is a tongue support or hanger 23 in which is pivoted a draft tongue or pole 24 adapted for connection with a tractor or other draft medium for the said carriage A. The tongue or pole 24 is pivoted at 25 for vertical swinging movement and when this tongue or pole is shifted laterally the front and rear steering wheels 14 and 15 will be turned for the guiding of the carriage in the draft of the same.

The main frame 10 is formed with a contracted open front end 26 and from the opposite side sill of this main frame rise vertical inverted substantially U-shaped front and rear yokes 27 and 28, respectively, supporting a longitudinally disposed approximately centered top beam 29 which is rigidly secured in saddled position to the yokes 27 and 28. It is preferable to have the front yoke 27 support a seat post 30 carrying an operator's seat 31. Suitably fitted to the front yoke 27 at the upper portions of the sides thereof are fittings 32 and 33, respectively, which have journaled therein the trunnions 34 of a vertically swinging cranked front end raising and lowering bail 35 while pivoted at 36 to the beam 29 close to the rear yoke 28 is a rear end curved raising and lowering horn 37. This horn 37 has pivotally connected thereto at 38 a shift link or rod 39 which is also pivoted at 40 to a throw lever 41 which swings vertically on a pivot 42 fixed in the fitting 32 at the right hand side of the carriage A. This fitting 32 carries a stationary keeper 43 provided with separated keeper notches 44 for receiving a latching bolt 45 carried by the throw lever 41 and urged in latching position by a spring 46. This lever 41 is equipped with a hand operated latch release 47 controlling the said latching bolt 45 and in this manner the lever 41 can be latched in adjusted position in accordance with the keeper notches 44 in the keeper 43.

Within the carriage A is the plow and sliced earth conveyor mechanism which comprises a frame B formed of forward side members 48 and 49 spaced from each other, rear side members 50 and 51 also spaced from each other and intermediate connecting or equivalent portions 52 either integral or separable parts. Suitable braces 53 are disposed between the members of the frame B and hold them spaced apart. These braces may be of any suitable construction. The forward and rear ends of the frame B are open while arranged at this forward open end is a forwardly tapered and inclined plow blade or slicing cutter 54 which is fixed and has its rear end next to a forwardly inclined short lengthed flooring or slice guide 55 stationarily held in the said frame B. In the rear open end of the frame B is a rearwardly inclined stationary short lengthed delivery flooring or slice guide 56, the forward open end of the frame B being the entrance end and the rear open end of said frame the delivery or discharge end.

Within the frame B are conveyor or belt tighteners which are designated, respectively, at 57, 58, 59 and 60, these being in the form of rollers with their axles journaled in yokes 61 suitably fastened in the frame B. The arrangement of these rollers with other rollers 66 support endless top, bottom and side conveyors or belts 62, 63 and 64, respectively, in a spiral relationship to each other, well defining a definite spiral. A cross section of these belts or conveyors when upon the rollers will show the latter arranged at the four corners of a rectangle so that there is constantly maintained between the working faces of the said belts or conveyors throughout the length thereof a substantially rectangular shaped spiral feed way 65 as shown in detail in Figure 23 of the drawings for the passage of a slice of soil or sod on the conveying of the same in the operation of the machine. The belts in their arrangement and in the length of the same extend completely between the floorings 55 and 56 within the frame B so that a slice of earth cut by the cutter 54 when riding upwardly on the flooring 55 will enter the space 65 and by activity of the belts such slice will be carried rearwardly onto the flooring 56 and thence redeposited onto the ground. When the slice is conveyed by the belts, it will be turned upside down after entering the feed space 65 so that its delivery upside down from the machine will be had, this turning of the slice being accomplished by the spiral arrangement of the belts when the machine is advanced and in operation.

The frame B has a forward top section 67 carrying spaced bearings 68 in which is journaled the bail 35 and in this manner the said frame is suspended or hung at its forward end within the carriage A while the said frame B at the top of the rear portion thereof carries cross bridge pieces 69 supporting a longitudinally disposed upstanding ridge piece 70 provided with a laterally directed stud 71 projecting from one side thereof and on which is journaled a bearing roller 72 which is adapted on the lifting of the forward end of the frame B to be disposed in the path of movement of the horn 37 so that the latter will engage with this roller 72 and when so engaged under manipulation will lift the rear end of the said frame B. When the frame B is in lowered position the roller 72 will be free of the horn 37 and this lowered position of the frame B is the ground working position of the machine, the raising and lowering of the frame B being hereinafter fully described.

The power wheel 21 at its hub 73 carries a beveled gear 74 meshing with a companion beveled pinion 75 fixed to a driven shaft 76 which latter is bracketed at 77 to the axle 20 so as to swing arcuately with the companion pinion 75 constantly meshing with the gear 74. Telescoped onto the shaft 76 is a tubular slidable extension shaft 78 which is provided with an elongated slot 79 accommodating a key 80 fixed in the shaft 76 and thus the said shafts are extensibly coupled together for rotation with each other. The shaft 78 has formed thereon one member 81 of a clutch, the other member 82 of the latter being loose on the said shaft 78 and has formed therewith or fixed thereto a driven gear 83 meshing with a companion pinion 84 fixed to a shaft 85 journaled in a bearing 86 disposed transversely of the top section 67 and crosswise at the top of the frame B. This shaft through coupled trains of gearings and shaftings 87 and 88, respectively, transfers motion or rotation to the power rollers for the belts for the proper driving of the belts 62, 63 and 64 in their arrangement within the frame B. Carried by the shaft 78 and active upon the clutch member 81 is an expansion spring 89 urging the member 81 in clutching activity or engagement with the member 82 so that when the clutch is in or closed the power wheel 21 will drive the belts before mentioned. Bracketing the member 82 of the clutch with the shaft 85 at 90 holds the gear and pinion 83 and 84 constantly enmesh with each other and such clutch will be caused to open or the members 81 and 82 thereof disengaged from each other when the forward end of the frame has become elevated, the forward end of the said frame being automatically raised and lowered in a manner presently described and when raised power to the belts for the driving thereof will be automatically cut off and such driving re-established when the said frame again becomes lowered, the clutch including the members 81 and 82 controlling the driving of the said belts while the raising and lowering of the frame B regulates the opening and closing of the said clutch.

The gear 74 is formed with an internally notched drum 91 while confronting the latter is a head 92 having a hub 93 splined or keyed to the axle 20. This head 92 has pivoted on opposite sides of its axis tripping detents or dogs 94, these operating in unison through linkage 95 therebetween and are urged for engagement in the internal notches 96 as formed in the drum 91 through springs 97 so that when these detents or dogs are engaged in the said notches power will be transferred from the wheel 21 to the axle 20. This axle 20 has fixed thereto a crank 98 while the bail 35 has fixed to one of its trunnions 34 a crank 99 and these cranks are connected by a pivot link 100 so that power from the wheel 21 will be utilized for the raising and lowering of the forward end of the frame B. On the side sill of the main frame 10 next to the head 92 is an upstanding bearing 101 pivotally supporting a tripping trigger 102 which is urged normally by a spring 103 into tripping engagement with the detents or dogs 94 to free the head 92 from the drum 91 and thus shutting off power from the wheel 21 to the lifting bail 35. This trigger 102 has connected with it an actuator cable 104 which extends to a convenient point for control by an operator of the tractor or draft medium for the machine and such cable is manually handled by such operator so that the forward end of the frame B can be raised or lowered automatically through power from the wheel 21 and at the time desired in the forward travel or the draft of said machine.

The trunnion 34 of the bail 35 carrying the crank 99 has fixed thereto a toothed rack segment 105 while the throw lever 41 has formed therewith a companion toothed rack segment end 106 for the segment 105 whereby on certain action of the frame B these segments will coact with each other. The crank 99 has formed with it a cam finger 107 which on movement of the said crank 99 will operate upon the latch bolt 45 to release the throw lever 41 from engagement in one of the keeper notches 44 in the keeper plate 43 and thus permitting meshing engagement of the segmental racks 105 and 106 with each other.

When the frame B is in working position for the slicing of the earth or sod, namely, in its lowermost position the throw lever 41 is engaged with the keeper 43 through the latch bolt 45 and in this position the horn 37 will have been lowered out of the path for engagement with the roller 72 on the stud 71 and the rack segment 105 has formed thereon next to its rack teeth an abutment or stop 108 and this is in striking relation to the rack segment 106 of the lever 41 thus in event that the latch bolt 45 is released it will be impossible to move the horn 37 to have it operate upon the frame B for the rear end lifting thereof. Now when it is desired that the front end of the frame B be raised, an operator pulls upon the cable 104 actuating the trigger 102 away from the detents or dogs 94 so that these detents or dogs 94 will lock in the notches 96 in the drum 91 thereby clutching the head 92 with the wheel 21 and power therefrom will be carried to the bail 35 causing it to swing in an upward direction and in this manner raising the front end of the frame B from the furrow opened by its cutter 54 or trench clear of the ground surface as shown in Figure 3 of the drawings. This upward movement of the forward end of the frame B causes the rack segment 105 to be shifted to the position shown in Figure 7 of the drawings and the segment 106 of the lever 41 is cleared therefrom. Now to lift the rear end of the frame B, it is required that the lever 41 be manually shifted or thrown moving the horn 37 bringing it into engagement with the roller 72 which has been so positioned for such engagement on the lifting of the front end of said frame B and through continued operation of the lever 41 the rear end of the frame B will be elevated by the said horn 37 as shown by dotted lines in said Figure 3 of the drawings. This complete lifting of the frame B brings the lever 41 to the position as shown in Figures 8 and 9 of the drawings and the relationship of the rack segments 105 and 106 is therein disclosed.

The head 92 at diametrically opposite points in the periphery thereof has formed therein keeper notches 109 each for accommodating a latching roller 110 carried at the lower end of the trigger 102 and the purpose of this roller in cooperation with the notches 109 is to lock the head 92 after it has been shifted by the power lift to avoid the accidental lowering as well as when raised. In other words, the roller 110 engaging in the notches 109 locks the frame B when its forward end has been raised or lowered.

Now when it is desired to lower the frame B into working position to the ground, it is first necessary to have the forward end of this frame lowered and to do this an operator must pull upon the cable 104 actuating the trigger 102 unlocking the head 92 therefrom and at the same time permitting the latching of the dogs or detents 94 with the drum 91 of the wheel 21. Thus the forward end of the frame B can now lower and on entry of the cutter 54 in the ground the cam finger 107 will have been brought into the position shown in Figure 10 while in Figure 11 of the drawings the rack segment 105 concurrently with the position of the finger is brought into mesh with the rack segment 106 on the lever 41 thus the finger 107 releases the bolt 45 and by the weight of the frame B as it drops into the ground the said lever 41 will be shifted by the meshing of the rack segments 105 and 106 and by the meshing engagement of the latter the horn 37 will be operated for the lowering of the rear end of the frame B and at this time the further lowering movements of the said frame B both at the forward and rear ends thereof will be synchronized thus the said frame B will be caused to properly locate itself in working position to the ground. When this takes place the roller 72 will be relieved from the horn 37 and the rear end of the frame B will sled the ground. The clutch including the members 81 and 82 operates at this moment to cut off power from the belts 62, 63 and 64 the instant the cutter 54 clears the ground and this cut off power avoids the operation of the said belts when the frame B is in a raised position. The instant the cutter 54 on the lowering of the forward end of the frame B makes contact with the ground the said clutch operates for power to be conveyed from the wheel 21 to the said belts.

The belts 62, 63 and 64, respectively, at the working faces thereof with respect to the slice of earth or sod have provided thereon cleats or cross slats 111, these functioning to grip the earth and also to render said belts taut to avoid buckling or troughing thereof in the spiral directional travel of the same while the other faces of these belts carry longitudinally directed antislipping beads or cordings 112, these fitting in annular channels or grooves 113 provided in the rollers constituting the guides for the said belts so that there is no possibility of the creeping of the belts laterally on the rollers carrying the same. These cordings 112 also maintain a uniform lateral stretching of the belts in the travel thereof.

Formed in the intermediate connecting or equivalent portion 52 at the right hand side of the frame B is a vertically disposed knife blade opening 114 confronted by a vertically disposed knife blade 115 which is outwardly angled to the adjacent side of the said frame B and the purpose of this blade 115 is for cutting the earth at one side of the open furrow to sufficiently widen the said furrow so that the slice of earth on the inverting of the same during the operation of the machine may be deposited in the furrow created to be seated therein and also affords free clearance for the frame B.

Associated with the knife 115 and directed inwardly with respect to the opening 114 is a turning wing 117 to turn the cut earth severed by the knife 115 over into the open furrow in the advancement of the machine.

Arranged centrally at the front open end of the frame B is a forwardly inclined upstanding knife 116 which extends from the tip of the cutter 54 to an elevated point of said frame and this knife functions to keep the large obstructions, such as stones, stumps, etc., from entering the open front end and clogging the same. This knife 116 slants back from the cutter 54 so that the obstructions will be worked upwardly out of the earth as the plow advances. This knife can be dispensed with if not required.

Provided at the forward upper open end of the frame B is a hitch 118 for the tractor or other draft medium so that both the said carriage A and the frame B will be subject to draft thereby.

Journaled in the forward and rear open ends of the frame B are the front and rear gage and slice presser rollers 119 and 120, respectively, the roller 119 regulates the thickness of the sliced earth at the entrance while the roller 120 at the delivery or discharge end of the said frame presses down the slice into the furrow when the machine is operating.

Knives 121 on the front portions of the members 48 and 49 are for splitting the earth for the opening of the furrow.

The roller 120 that presses down the slice as it leaves the plow helps to pack the soil tight so that no air can get to the roots and tops of the noxious weeds with the result that they will be smothered.

Heretofore with the use of other implements to destroy noxious weeds they are dug up and the roots and tops are burned so that this valuable vegetable matter is totally lost to the ground and by the use of the plow before described this vegetable matter is left in the ground and serves as a fertilizer to enrich the soil.

When poison is used to destroy noxious weeds, the ground must lay idle a few years until the poison has time to be washed into the subsoil as nothing will grow while this poison is in the top soil. In the use of the present invention the land can and should be used immediately after being acted upon by the plow so that the ground need not be idle.

In the functioning of the machine when in operation on advancement thereof the earth will be sliced and such slice will have a determined thickness in conformity with the lay of the cutter 54 when the frame B is in lowered working relation to the soil. This sliced earth by the operation of the belts 62, 63 and 64 will be caused to turn upside down and become redeposited in the furrow opened by the machine. Therefore, weeds or plants, particularly quack grass, will be killed or exterminated in that the roots of such growing weeds or plants will be uprooted and turned uppermost while the plants will be turned downwardly in the ground and in this manner effectually killing or exterminating such growth.

It is to be particularly understood that with this machine a slice cut from the ground surface is of such thickness as to entirely contain the roots of the grass, weeds or plants and that this slice is overturned so as to smother both the grass and the roots, the latter being uprooted, this being a necessity of quack grass when the same is to be exterminated or killed otherwise such grass will grow again.

This implement will cut a slice sufficiently beneath the roots of the weeds and quack grass so as to take up enough soil to bury the roots of the quack grass or weeds to a sufficient depth in the soil so that the tops and roots will both be smothered. The roots of noxious weeds must not be exposed or near the top of the ground as the same will start to grow again.

It is, of course, understood that in mentioning draft medium for the machine this will embrace draft animals as such machine under its draft may be had by animals, a tractor or otherwise.

An essential refinement present in this invention over the subject matter of United States Letters Patent No. 1,919,705 issued on the twenty-fifth day of July, 1933, resides in the adjustment of the frame B both mechanically and manually and additionally in the power control for the operation of the belts effecting the turning over of the soil when sliced from the ground for the redeposit of such slice upside down into the open ditch or furrow.

The rollers 110 on the trigger 102 in the working thereof simultaneously lock the head 92 against free turning movement and the release of the detents or dogs 94 from engagement in the notches 96 in the drum 91 and inversely the unlocking of the head 92 and the engagement of the detents or dogs in the notches in said drum, the trigger 102 being manually controlled by an operator as hereinbefore stated.

The purpose of the implement is to destroy noxious weeds and to leave the weed tops and roots in the ground so that the same will afford fertilizer for the soil.

When the slice is turned over by this implement the seed bed will be deeper than when plowed by an ordinary plow thus giving plants more room for the roots to grow in and the ground can be used continuously without the necessity of its becoming idle.

Arranged at the front end of the implement are cleats 122 which engage the frame 10 of the carriage A to keep the plow share or blade from going too deep into the ground.

If found necessary a spring could be employed to aid the operator in raising the rear end of the frame B off the ground.

It may be possible to employ but two wheels on the carriage instead of three wheels and this is contemplated within the scope of the invention.

The raising and lowering horn 37 which is in turn controlled by the rack segments 105 and 106 prevents the rear end of the plow from dropping too fast as the same is lowered into the ground. As the rear end of the plow is lowered to the ground the bearing roller 72 causes the raising and lowering horn 37 to lock the throw lever 41 in the forward position as is shown in Figure 1 of the drawings and at the same time the throw lever 41 also locks the raising and lowering horn 37 so that the said horn will be in the proper place to engage the bearing roller 72 to raise the rear end of the plow off the ground.

From the foregoing it is thought that the construction and manner of operation of the implement will be clearly understood and therefore a more extended explanation has been omitted. Changes, variations and modifications may be made in the implement as fall properly within the scope of the appended claims without departing from the spirit of the invention or sacrificing any of its advantages.

In Figures 24, 25 and 26 of the drawings there is shown a slight modification of conveyor or belt wherein the body of the same is made up of strands of cords 123 arranged side by side and united by reversely disposed zigzag stitches of threads 124 which cross each other immediately of the belt and such belt or conveyor is equipped with antislipping beads or cordings 112 at one side while at the other side are the cross slats 111.

The belts 62, 63 and 64, respectively, are made from canvas although such belts may be otherwise formed.

What is claimed is:

1. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, and mechanism operative from a wheel of the carriage for driving the second-mentioned mechanism.

2. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, and means manually actuated for regulating the raising and lowering of the frame.

3. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, and means for automatically regulating the operation of the second-mentioned mechanism when the frame is being raised or lowered from and to working relation to the ground.

4. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, and means for independently hitching the carriage and the frame to a draft medium.

5. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, and a knife carried at one side of said frame.

6. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, a knife carried at one side of said frame, and a turning over wing next to said knife.

7. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, a knife carried at one side of said frame, and a turning over wing next to said knife for the turning over of the earth cut thereby into the furrow.

8. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, a knife carried at one side of said frame, a turning over wing next to said knife and located within the frame for the turning over of the earth cut thereby into the furrow opened by the said slice cutter, and a ground splitting knife arranged next to the slice cutter.

9. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, a knife carried at one side of said frame, a turning over wing next to said knife for the turning over of the earth cut thereby into the furrow opened by the said slice cutter, and a knife arranged next to the slice cutter and forwardly inclined and rising from the tip of said cutter.

10. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, a knife carried at one side of said frame, a turning over wing next to said knife for the turning over of the earth cut thereby into the furrow opened by the said slice cutter, a knife arranged next to the slice cutter and forwardly inclined and rising from the tip of said cutter, and gage and presser rollers carried by the frame.

11. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, a knife carried at one side of said frame, a turning over wing next to said knife for the turning over of the earth cut thereby into the furrow opened by the said slice cutter, a knife arranged next to the slice cutter and forwardly inclined and rising from the tip of said cutter, gage and presser rollers carried by the frame, and tightening means included with said second-mentioned mechanism.

12. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, a knife carried at one side of said frame, a turning over wing next to said knife for the turning over of the earth cut thereby into the furrow opened by the said slice cutter, a knife arranged next to the slice cutter and forwardly inclined and rising from the tip of said cutter, gage and presser rollers carried by the frame, tightening means included with said second-mentioned mechanism, and means for locking the frame when raised or lowered against accidental movement.

13. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, a knife carried at one side of said frame, a turning over wing next to said knife for the turning over of the earth into the furrow opened by the said slice cutter, a knife arranged next to the slice cutter and forwardly inclined and rising from the tip of said cutter, gage and presser rollers carried by the frame, tightening means included with said second-mentioned mechanism, means for locking the frame when raised or lowered against accidental movement, and means for spirally directing the second-mentioned mechanism and maintaining a substantially rectangular shaped feed formation throughout the spiral direction.

14. A machine of the character described comprising a wheeled carriage having steering mechanism, a frame supported in the carriage, mechanism within said frame for feeding of earth in slice formation and turning of the slice upside down prior to delivery from the frame, a cutter forwardly of said frame for slicing earth from a ground surface, mechanism partly operative from a wheel of the carriage for elevating and lowering the frame away from and to working relation to the ground, mechanism operative from a wheel of the carriage for driving the second-mentioned mechanism, means manually actuated for regulating the raising and lowering of the frame, means for automatically regulating the operation of the second-mentioned mechanism when the frame is being raised or lowered from and to working relation to the ground, means for independently hitching the carriage and the frame to a draft medium, a knife carried at one side of said frame, a turning over wing next to said knife for the turning over of the earth into the furrow opened by the said slice cutter, a knife arranged next to the slice cutter and forwardly inclined and rising from the tip of said cutter, gage and presser rollers carried by the frame, tightening means included with said second-mentioned mechanism, means for locking the frame when raised or lowered against accidental movement, means for spirally directing the second-mentioned mechanism and maintaining a substantially rectangular shaped feed formation throughout the spiral direction, and cutters at opposite sides of the slice cutter for opening the ground for the latter.

MARTIN J. PETERSEN.